(12) United States Patent
Breier et al.

(10) Patent No.: US 7,235,904 B2
(45) Date of Patent: Jun. 26, 2007

(54) DEVICE FOR COUPLING A HOUSING ARRANGEMENT OF A COUPLING DEVICE TO A ROTOR ARRANGEMENT OF AN ELECTRIC MACHINE

(75) Inventors: Horst Breier, Dittelbrunn (DE); Christoph Sasse, Schweinfurt (DE); Jörg Sudau, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 264 days.

(21) Appl. No.: 10/503,455

(22) PCT Filed: Feb. 26, 2003

(86) PCT No.: PCT/EP03/01952

§ 371 (c)(1),
(2), (4) Date: Aug. 3, 2004

(87) PCT Pub. No.: WO03/081064

PCT Pub. Date: Oct. 2, 2003

(65) Prior Publication Data

US 2005/0150734 A1  Jul. 14, 2005

(30) Foreign Application Priority Data

Mar. 26, 2002 (DE) ............... 102 13 559
May 15, 2002 (DE) ............... 102 21 625

(51) Int. Cl.
*H02K 7/00* (2006.01)
*H02K 7/10* (2006.01)
(52) U.S. Cl. .................... 310/75 R; 310/92
(58) Field of Classification Search ............ 192/3.28, 192/3.29; 310/75 R, 51, 68 B, 76, 92, 96, 310/97, 98, 100
See application file for complete search history.

(56) References Cited

U.S. PATENT DOCUMENTS 5,691,588 A * 11/1997 Lutz et al. ............... 310/92

(Continued)

FOREIGN PATENT DOCUMENTS

DE  10000253  7/2001

*Primary Examiner*—Darren Schuberg
*Assistant Examiner*—David W. Scheuermann
(74) *Attorney, Agent, or Firm*—Cohen Pontani Lieberman & Pavane LLP

(57) ABSTRACT

A device for coupling a housing arrangement of a clutch device, particularly a hydrodynamic clutch device, to a rotor arrangement of an electric machine, wherein the rotor arrangement can be connected to a drive shaft so as to be fixed with respect to rotation relative to it, this drive shaft being rotatable around an axis of rotation. The electric machine further has a stator arrangement which can be brought into electromagnetic interaction with the rotor arrangement and the drive shaft can be driven in rotation by the electric machine and/or electrical energy can be generated by rotation of the drive shaft. First teeth provided at the rotor arrangement and second teeth provided at the housing arrangement are in a rotational driving engagement with one another or can be brought into a rotational driving engagement with one another, and an axial securing arrangement holds the rotor arrangement in axial direction with respect to the housing arrangement. The axial securing arrangement includes at least one catch member with at least one radially resilient catch projection at a structural component of one of the rotor arrangement and housing arrangement and has a catch recess associated with each catch projection at a structural component of the other of the rotor arrangement and housing arrangement.

14 Claims, 10 Drawing Sheets

U.S. PATENT DOCUMENTS

| | | | |
|---|---|---|---|
| 6,215,213 B1 * | 4/2001 | Forster et al. | 310/78 |
| 6,258,001 B1 * | 7/2001 | Wakuta et al. | 475/5 |
| 6,373,205 B1 * | 4/2002 | Weimer et al. | 318/114 |
| 6,437,467 B1 * | 8/2002 | Schierling et al. | 310/51 |
| 6,478,101 B1 * | 11/2002 | Taniguchi et al. | 180/65.2 |
| 6,528,918 B2 | 3/2003 | Paulus-Neues et al. | |
| 2001/0015584 A1 * | 8/2001 | Paulus-Neues et al. | 310/75 D |

* cited by examiner

DEVICE FOR COUPLING A HOUSING ARRANGEMENT OF A COUPLING DEVICE TO A ROTOR ARRANGEMENT OF AN ELECTRIC MACHINE

CROSS REFERENCE TO RELATED APPLICATIONS

This is a U.S. national stage application under 35 U.S.C. §371 of international stage application No. PCT/EP03/01952, filed on Feb. 26, 2003. Priority is claimed under 35 U.S.C. §119(a) and 35 U.S.C. §365(b) from German Patent Application No. 10213559.2, which was filed on Mar. 26, 2002; and German Patent Application No. 10221625.8, which was filed on May 15, 2002, from which priority was properly claimed in the aforementioned international stage application.

FIELD OF THE INVENTION

The present invention is directed to a device for coupling a housing arrangement of a clutch device, particularly a hydrodynamic clutch device, to a rotor arrangement of an electric machine, wherein the rotor arrangement of the electric machine is coupled, or is to be coupled, to a drive shaft so as to be fixed with respect to rotation relative to it, this drive shaft being rotatable around an axis of rotation, wherein the electric machine further has a stator arrangement which can be brought into electromagnetic interaction with the rotor arrangement and the drive shaft can be driven in rotation by the electric machine and/or electrical energy can be generated by the rotation of the drive shaft.

BACKGROUND OF THE INVENTION

U.S. Pat. No. 6,528,918 discloses a drive system in which a housing arrangement of a hydrodynamic clutch device is coupled with the rotor arrangement of an electric machine acting as a starter generator so as to be fixed with respect to rotation relative to it and so as to be fixed axially. For this purpose, a toothing element is secured to the housing of the hydrodynamic clutch device and, when producing the rotational coupling, engages in a toothing formed at the rotor carrier of the rotor arrangement so that the rotational coupling is realized. Further, an axial coupling element in the form of a screw sleeve is held at the toothing element that is secured to the housing arrangement and is screwed onto an outer circumferential area of the rotor arrangement after the housing arrangement has been moved axially to the rotor arrangement, so that it is ensured that the two toothing arrangements which engage one inside the other are held in axial engagement and the housing arrangement and rotor arrangement are therefore coupled with one another so as to be fixed not only with respect to rotation but also axially.

The present invention provides a simply constructed and reliably operating device for coupling a housing arrangement of a clutch device, particularly a hydrodynamic clutch device, to a rotor arrangement of an electric machine.

According to a first aspect of the present invention, a drive system includes a device for coupling a housing arrangement of a clutch device, particularly a hydrodynamic clutch device, to a rotor arrangement of an electric machine, wherein the rotor arrangement of the electric machine can be connected to a drive shaft so as to be fixed with respect to rotation relative to it, this drive shaft being rotatable around an axis of rotation. The electric machine further has a stator arrangement which can be brought into electromagnetic interaction with the rotor arrangement and the drive shaft can be driven in rotation by the electric machine and/or electrical energy can be generated by rotation of the drive shaft. First teeth fixed to the rotor arrangement and second teeth fixed to the housing arrangement are in a rotational driving engagement with one another or can be brought into a rotational driving engagement with one another, and an axial securing arrangement holds the rotor arrangement in axial direction with respect to the housing arrangement.

According to the invention, it is further provided that the axial securing arrangement comprises at least one catch member at a structural component of the rotor arrangement and housing arrangement and has a catch receptacle associated with this catch member at the other structural component of the rotor arrangement and housing arrangement.

In this embodiment form of a device according to the invention, axial securing is achieved by a catch action, so that, the components provided for achieving axial securing can be constructed in an appreciably simpler manner compared to components which can be brought into threaded engagement. For example, at least one catch recess can be formed in the area of the teeth of the rotor arrangement and/or in the area of the teeth of the housing arrangement. This arrangement is particularly advantageous because when sheet-metal formed parts are used the teeth are generally produced during the forming process and the at least one catch recess can be formed at the same time without causing any fundamental structural weakening in the structural component part.

In order to be able to produce different structural component parts and working areas from optimal materials for the requirements imposed on them, it is proposed that at least one catch member is secured to a structural component part providing the toothing configuration of the rotor arrangement and/or that at least one catch member is secured to a structural component part providing the toothing configuration of the housing arrangement. Alternatively, it is advantageous particularly with respect to the simplest possible construction when at least one catch member is formed integral with a structural component part providing the toothing configuration of the rotor arrangement and/or when at least one catch member is formed integral with a structural component part providing the toothing configuration of the housing arrangement. The axial securing arrangement which works by a catching action can be relieved in that an axial movement stop is provided at a structural component part providing a toothing configuration. Further, it is advantageous for carrying out maintenance processes or repair work when a releasing portion is provided on at least one catch member for preferably manual disengagement of the catch engagement of the catch member.

According to another aspect of the present invention, the above-stated object is met by a device for coupling a housing arrangement of a clutch device, particularly a hydrodynamic clutch device, to a rotor arrangement of an electric machine, wherein the rotor arrangement of the electric machine is coupled, or is to be coupled, to a drive shaft so as to be fixed with respect to rotation relative to it, this drive shaft being rotatable around an axis of rotation, wherein the electric machine further has a stator arrangement which can be brought into electromagnetic interaction with the rotor arrangement and the drive shaft can be driven in rotation by the electric machine and/or electrical energy can be generated by rotation of the drive shaft, wherein the device comprises toothing configurations at the rotor arrangement and at the housing arrangement which are in a rotational driving engagement with one another or can be brought into a rotational driving engagement with one another.

Further, a friction device which opposes a rotation of the rotor arrangement relative to the housing arrangement is provided according to the invention.

The basic aim consists in so constructing the toothing configurations which engage with one another or can be brought into engagement with one another that they cooperate substantially without rotational movement play. However, above all when using sheet-metal formed parts, there is often a risk that small gaps will remain so that a slight movement play exists. As a result of the friction device which is to be provided according to the invention, a substantially free rotation of the housing arrangement relative to the rotor arrangement which can very easily lead to impact noises, can not occur in spite of any movement play that may be present.

In this connection, it is further advantageous when an arrangement for limiting axial movement of the housing arrangement relative to the rotor arrangement is formed by the friction device in at least one axial direction. Further, the occurrence of even slight relative rotation in the area of the movement play of the engaging toothing configurations can be effectively eliminated in that the friction device comprises friction areas at the rotor arrangement and at the housing arrangement which interact by magnetic force or which can be brought to interact by magnetic force.

Of course, the friction device may also be provided when an axial securing arrangement which holds the housing arrangement and rotor arrangement together axially, e.g., through a catch action, is provided as was described in the preceding. In this case, it can also be ensured that the axial securing arrangement provides pretensioning for the friction device.

According to a further aspect, the present invention is directed to a device for coupling a housing arrangement of a clutch device, particularly a hydrodynamic clutch device, to a rotor arrangement of an electric machine, wherein the rotor arrangement of the electric machine is coupled, or is to be coupled, to a drive shaft so as to be fixed with respect to rotation relative to it, this drive shaft being rotatable around an axis of rotation, wherein the electric machine further has a stator arrangement which can be brought into electromagnetic interaction with the rotor arrangement and the drive shaft can be driven in rotation by the electric machine and/or electrical energy can be generated by rotation of the drive shaft, wherein the device comprises toothing configurations at the rotor arrangement and at the housing arrangement which are in a rotational driving engagement with one another or can be brought into a rotational driving engagement with one another.

This device is further characterized by coupling areas which interact through magnet force or which can be brought to interact through magnetic force and are provided at the rotor arrangement and at the housing arrangement.

It can further be provided in the device according to the invention that the toothing configuration of the rotor arrangement is formed at a rotor carrier and/or that the toothing configuration of the housing arrangement is formed at a structural component part of the housing arrangement. Further, it is possible that the toothing configuration of the rotor arrangement is formed at a toothing structural component part that is fixedly connected to a rotor carrier and/or that the toothing configuration of the housing arrangement is formed at a toothing structural component part that is fixedly connected to a housing structural component part.

According to another aspect of the present invention, the above-stated object is met by a device for coupling a housing arrangement of a clutch device, particularly hydrodynamic clutch device, to a rotor arrangement of an electric machine, wherein the rotor arrangement of the electric machine is coupled, or is to be coupled, to a drive shaft so as to be fixed with respect to rotation relative to it, wherein the electric machine further has a stator arrangement which can be brought into electromagnetic interaction with the rotor arrangement and the drive shaft can be driven in rotation by the electric machine and/or electrical energy can be generated by rotation of the drive shaft.

According to the invention, it is further provided that the device comprises a flexible, plate-like coupling element which is to be connected in a first coupling area to the rotor arrangement and is to be connected in a second coupling area to the housing arrangement.

Flexible, plate-like coupling elements of the type mentioned above have proven to be particularly economical but, at the same time, also very reliably operating structural component parts for transmitting torque between a rotor arrangement and a housing arrangement.

For example, the coupling element can be connected in at least one of the coupling areas by screwing. Further, the coupling element can be connected in at least one coupling area by riveting.

According to another aspect of the present invention, the above-stated object is met by a device for coupling a housing arrangement of a clutch device, particularly hydrodynamic clutch device, to a rotor arrangement of an electric machine, wherein the rotor arrangement of the electric machine is coupled, or is to be coupled, to a drive shaft so as to be fixed with respect to rotation relative to it, wherein the electric machine further has a stator arrangement which can be brought into electromagnetic interaction with the rotor arrangement and the drive shaft can be driven in rotation by the electric machine and/or electrical energy can be generated by rotation of the drive shaft.

This device according to the invention is characterized by a torsional vibration damper arrangement with a primary side that is connected to the rotor arrangement for common rotation and a secondary side which is connected to the housing arrangement for common rotation and which is coupled to the primary side by a damper element arrangement for transmitting torque.

By incorporating a torsional vibration damper arrangement in the torque transmission path and as a device which provides the rotational connection between the housing arrangement and the rotor arrangement and drive shaft, respectively, torsional vibrations can be efficiently damped.

In this respect, it can be provided, for example, that the primary side has a damper element supporting element which encloses some areas of the damper elements of the damper element arrangement and in which a damper element counter-supporting element of the secondary side engages for interaction with the damper elements of the damper element arrangement.

A particularly simple construction can be achieved in that a rotor carrier of the rotor arrangement forms the damper element supporting element at least in part.

In order to prevent overloading of various damper elements when the torque peaks to be transmitted become too large, it is proposed that the damper element supporting element and the damper element counter-supporting element have stop areas which cooperate to limit the rotational angle.

Since the housing arrangement is also generally constructed with sheet-metal formed parts at least in some areas, it is suggested that a damper element counter-supporting element of the secondary side is secured to the housing arrangement in the area of shaped portions of the housing arrangement in order to increase stability in the area where the secondary side of the torsional vibration damper arrangement is connected to the housing arrangement.

In another embodiment form according to the invention, it can be provided that the primary side comprises a driving element that is connected to the rotor arrangement for common rotation and to which at least one damper element supporting area of the primary side is connected for common rotation. It is advantageous particularly in drive systems in which very large torques must be transmitted, e.g., in utility vehicles or commercial vehicles, when at least two damper element supporting areas of two damper element sets of the damper element arrangement which act in parallel are connected to the driving element.

The present invention will be described in more detail in the following with reference to the accompanying drawings showing preferred embodiment forms.

BRIEF DESCRIPTION OF THE EMBODIMENTS

DETAILED DESCRIPTION OF THE PREFERRED EMBODIMENTS

Figure 1:
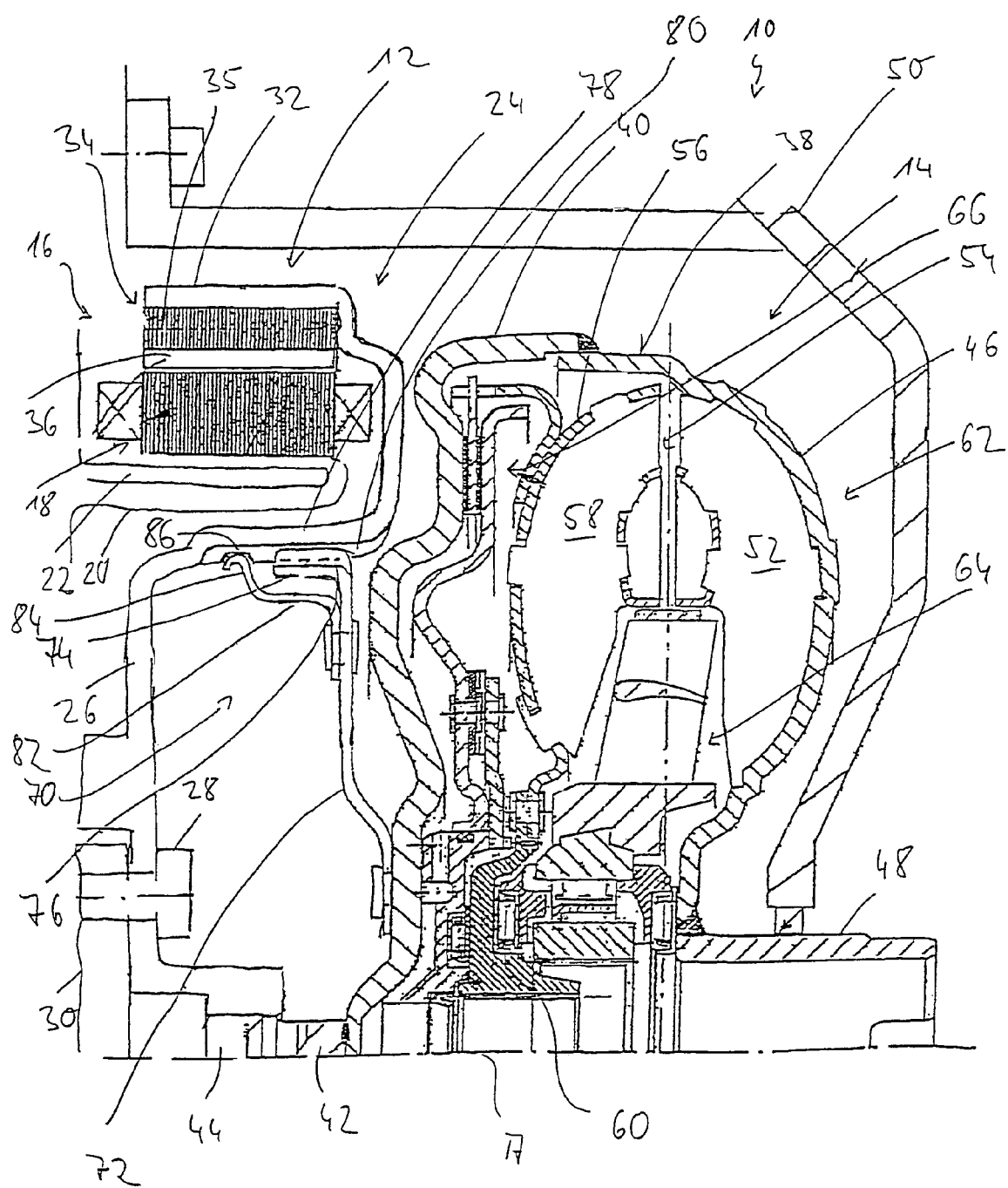
FIG. 1 shows a partial longitudinal section through a drive system comprising an electric machine and a hydrodynamic torque converter.

FIG. 1 shows a drive system 10 which comprises two essential system areas. One of these system areas is an electric machine 12 and the other is a hydrodynamic clutch device 14, in this case in the form of a hydrodynamic torque converter.

The electric machine 12 has a stator arrangement 16 with a stator winding arrangement 18 on a stator carrier 20, this stator winding arrangement 18 being arranged around the axis of rotation A. In the example shown here, the stator carrier 20 is secured, for example, to an engine block and has a fluid flow duct arrangement 22 for supplying coolant in the area of the stator winding arrangement 18. A rotor arrangement 24 of the electric machine 12 comprises a rotor carrier 26 which is constructed in the manner of a housing and which is provided, for example, as a sheet-metal formed part. This rotor carrier 26 is connected in its radial inner area by screw bolts 28 or the like to a drive shaft 30, e.g., a crankshaft of an internal combustion engine, so as to be fixed with respect to rotation relative to it. In a radial outer area, the rotor carrier 26 encloses the stator arrangement 16 and carries a rotor interaction area 34 in an outer, approximately cylindrical portion 32. This rotor interaction area 34 comprises, for example, a plurality of sheet metal disks 35 which contact one another and which form a yoke for permanent magnets 36 supported at their inner circumference side.

The drive shaft 30 can be driven in rotation by the electric machine 12, constructed in this example as an external rotor machine, for starting the drive unit. When the drive unit is running, electrical energy can be generated by the electric machine 12, which is also constructed as a synchronous machine, when appropriately connected. Further, it is, of course, possible to damp torsional vibrations occurring in the drive system through buildup of counter vibrations by controlling the electric machine 12 in a corresponding manner.

The hydrodynamic clutch device 14, which is constructed as a hydrodynamic torque converter, comprises a housing arrangement which is designated generally by 38. This housing arrangement 38 in turn comprises a housing cover 40 which is positioned at the side of the hydrodynamic clutch device 14 facing the electric machine 12. The housing cover 40 carries a bearing pin 42 in the radial inner area. This bearing pin 42 is positioned so as to engage in a corresponding bearing recess 44 in the radial inner area of the rotor carrier 26 which is connected to the drive shaft 30 so as to be fixed with respect to rotation relative to it in order, among other things, to center the hydrodynamic clutch device 14 with respect to the drive shaft 30. The housing arrangement 38 further comprises an impeller wheel shell 46 which is fixedly connected to an impeller wheel hub 48 in its radial inner area. This impeller wheel hub 48 is supported in a bell-shaped housing arrangement 50 which covers the entire drive system 10 externally and which can be provided at least partially by a transmission housing.

The impeller wheel shell 46 carries impeller wheel blades 52 at its inner side. Further, a turbine wheel 54 having a plurality of turbine wheel blades 58 supported at a turbine wheel shell 56 is provided in the interior of the housing arrangement 38. The turbine wheel shell 56 is connected on the radial inner side to a turbine wheel hub 60 so as to be fixed with respect to rotation relative to it; this turbine wheel hub 60 can be coupled in turn to a driven shaft of the hydrodynamic clutch device 14, for example, a transmission input shaft, so as to be fixed with respect to rotation relative to it. A stator wheel 64 is located between the turbine wheel shell 56 and the impeller wheel 62, which substantially comprises the impeller wheel shell 46, the impeller wheel blades 52 and the impeller wheel hub 48. The stator wheel 64 is supported on a supporting element, not shown, so as to be rotatable in one direction around the axis of rotation and so as to be secured against rotation in the other direction. Further, a lockup clutch arrangement, designated in general by 66, is provided for achieving a direct torque transmission connection between the housing arrangement 38 and the turbine wheel 54 which is realized through the use of coulomb friction.

It should be noted that many variations can be applied both in the area of the hydrodynamic clutch device 14 and in the area of the electric machine 12 without diverging from the principles of the present invention which are described hereinafter.

FIG. 1 also shows an arrangement, designated generally by 70, by which the housing arrangement 38 of the hydrodynamic clutch device 14 is coupled to the electric machine 12, namely, the rotor arrangement 24 thereof. This coupling arrangement 70 comprises a coupling element 72 which is arranged on the housing cover 40, e.g., by riveting, and which can be shaped like an annular disk. In its radial outer area, the coupling element 72 has, in a substantially axially extending portion 74, a toothing configuration 76 which is directed substantially radially outward, i.e., is constructed as a spur gear. Another toothing configuration 80 that is oriented substantially radially inward is formed at a portion 78 of the rotor carrier 26 which likewise extends approximately axially and which lies in the area radially inside the stator winding arrangement 18. The two toothing configurations 76, 80 are in a rotational driving engagement with one another so that, in this way, the housing arrangement 38 of the hydrodynamic clutch device 14 and the rotor carrier 26 of the rotor arrangement 24 are coupled so as to be fixed with respect to rotation. Since the coupling element 72 and the rotor carrier 26 are generally provided by sheet-metal formed parts, the two toothing configurations 76, 80 can be produced during the forming process so that the stability of these structural component parts is increased at the same time.

For purposes of axial securing, an axial securing element 82 which is likewise ring-shaped, for example, is fixedly connected to the coupling element 72, e.g., again by riveting. This axial securing element or catch member 82 preferably comprises a plurality of catch projections 84 which are distributed in circumferential direction and which engage in associated catch recesses 86 at the rotor carrier 26. These catch recesses 86 are preferably formed in the area of the teeth of the toothing configuration 80, particularly in the area of teeth which project radially inward. The axial securing element 82, which is likewise preferably constructed from sheet metal material and therefore has a certain radial resilience in the area of its catch projections 84, engages by its catch projections 84 in associated catch recesses 86 when the housing arrangement 38 is moved axially to the rotor carrier 26 when producing the rotational coupling, so that the rotor carrier 26 and the housing arrangement 38 are fixedly held together axially. For purposes of disengagement, it is necessary only to overcome a determined axial catching torque, whereupon the two toothing configurations 76, 80 can then be disengaged by a relative axial movement.

Figure 2:
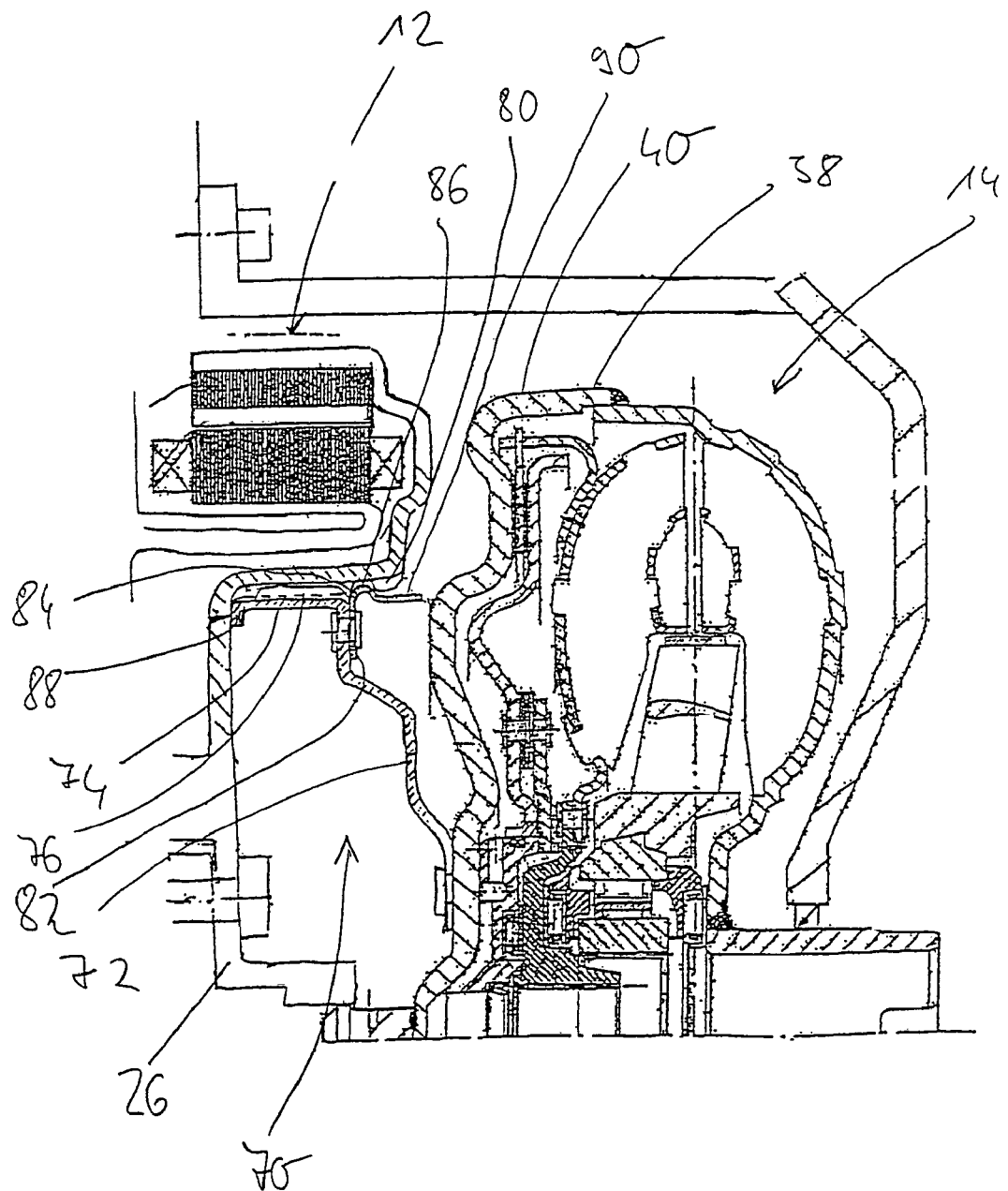
FIG. 2 is a view, corresponding to FIG. 1, of an alternative embodiment form.

FIG. 2 shows a modification of the embodiment form shown in FIG. 1. This Figure again shows the coupling element 72 which is secured to the housing arrangement 38 and which has its toothing configuration 76 at the portion 75 extending approximately in axial direction. In a modification of the embodiment form described in the preceding, the axial securing element 82 is now arranged at the side of the coupling element 72 remote of the rotor carrier 26, so that it essentially lies between the coupling element 72 and the housing cover 40 of the housing arrangement 38. This also means that the catch recesses 86 in the toothing configuration 80 are now provided at the other axial end area.

This different positioning of the axial securing element 82 has two important results. For one, it is possible for the coupling element 72 to make axial contact with the rotor carrier 26 by one axial end portion 88 of the substantially axially extending portion 74 so that an arrangement for limiting axial movement, or an axial stop, is provided when advancing the hydrodynamic clutch device 14. Further, this altered positioning of the axial securing element affords access to the releasing portions 90 provided at the coupling projections 84 from the radial outer side through a gap between the housing cover 40 and the rotor carrier 26, for example, through the use of an appropriate tool. In order to release the catch engagement, these releasing portions 90 can be pressed so that the hydrodynamic clutch device can then be moved axially away from the electric machine 12 without a great expenditure of force. This is advantageous because the catch projections 84 of the axial securing element 82 can engage in the associated catch recesses 86 with greater locking force without resulting in substantial problems when disassembling the system. The axial securing can be further improved in this way. The configuration in this case is preferably carried out in such a way that a force which pretensions the coupling element 72 in axial direction toward the rotor carrier 26 is generated when the catch projections 84 engage in the catch recesses 86, so that the axial stop 88 is held in secure contact with the rotor carrier 26. The desired axial thrust support can accordingly be realized without the risk of impact noise.

Figure 3:
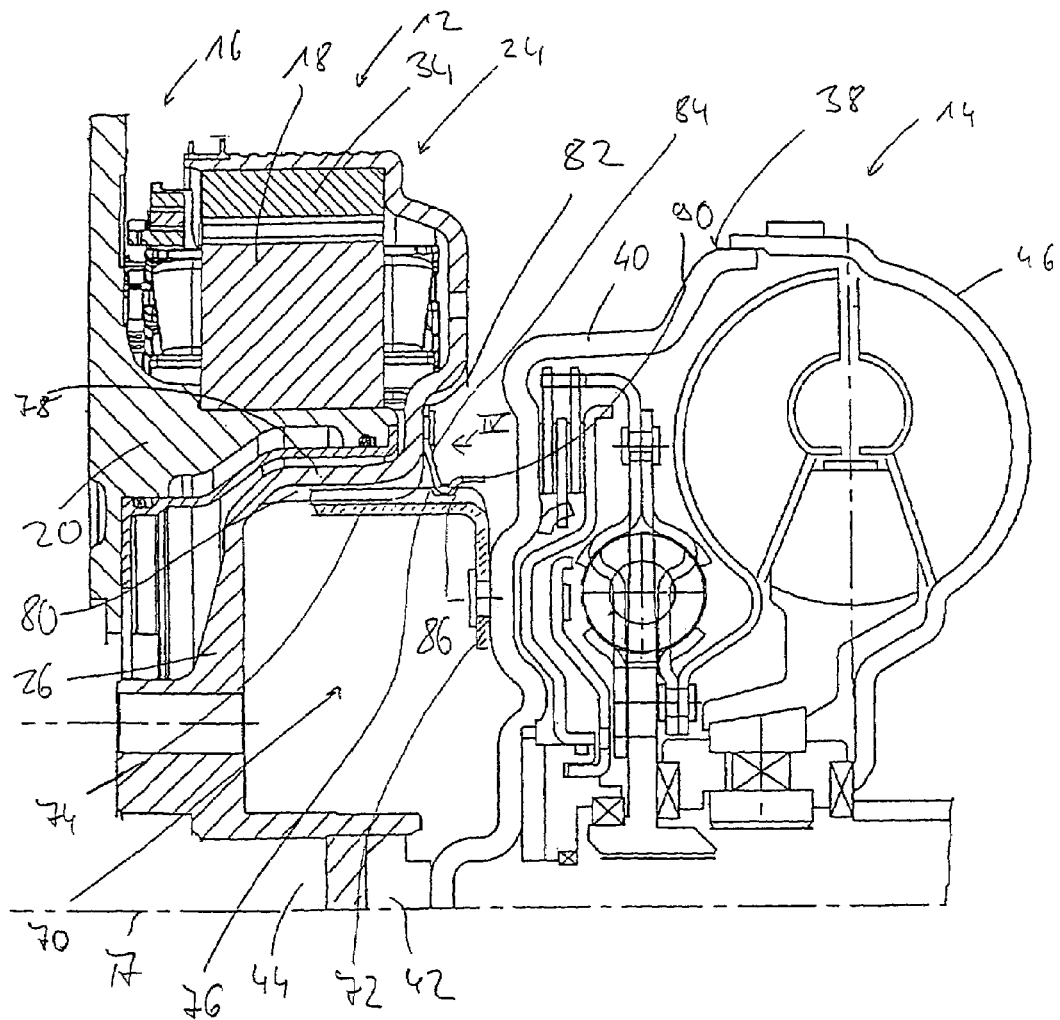
FIG. 3 is another view, corresponding to FIG. 1, of an alternative embodiment form.
Figure 4:
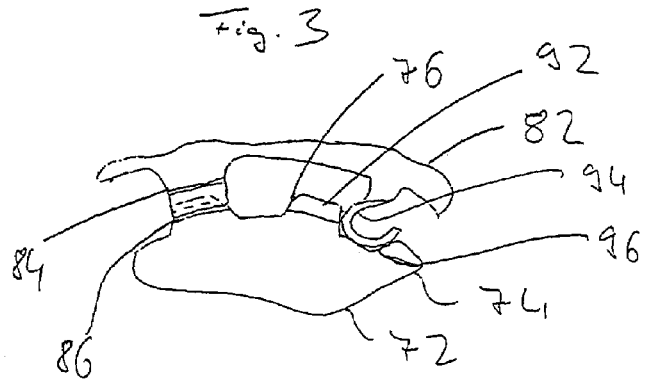
FIG. 4 is a detailed view of a catch element used in the embodiment form according to FIG. 3 in viewing direction IV in FIG. 3.

FIG. 3 shows an embodiment form in which the axial securing element 82 is secured, e.g., by riveting, in an area radially outside of the toothing configuration 76 of the coupling element 72. The catch projections 84 of the generally ring-shaped axial securing element 82 which are arranged successively in circumferential direction extend radially inward into the catch recesses 86 which are also preferably formed in this case in the area of the teeth 92 of the toothing configuration 76. As can be seen from FIG. 4, the axial securing element 82 also has radial centering projections 94 which can alternate, for example, in circumferential direction, with the catch projections 84. These radial centering projections 94 are formed in such a way that they engage, respectively, in a gap 96 between two teeth 92 of the toothing configuration 76 under radial pretensioning, enabled by the elasticity of the axial securing element 82 made of sheet-metal material, and exert a radial pressure on the coupling element 72. Since a plurality of radial centering projections 94 are distributed in circumferential direction, a uniform loading of the coupling element 72 is achieved, so that the latter is centered in a defined manner in radial direction with respect to the rotor carrier 26. In particular, as a result of this, the two toothing configurations 76, 80 engaging one inside the other need not be exactly matched to one another radially, but the occurrence of noise induced by relative radial movement is nevertheless prevented.

Figure 5:
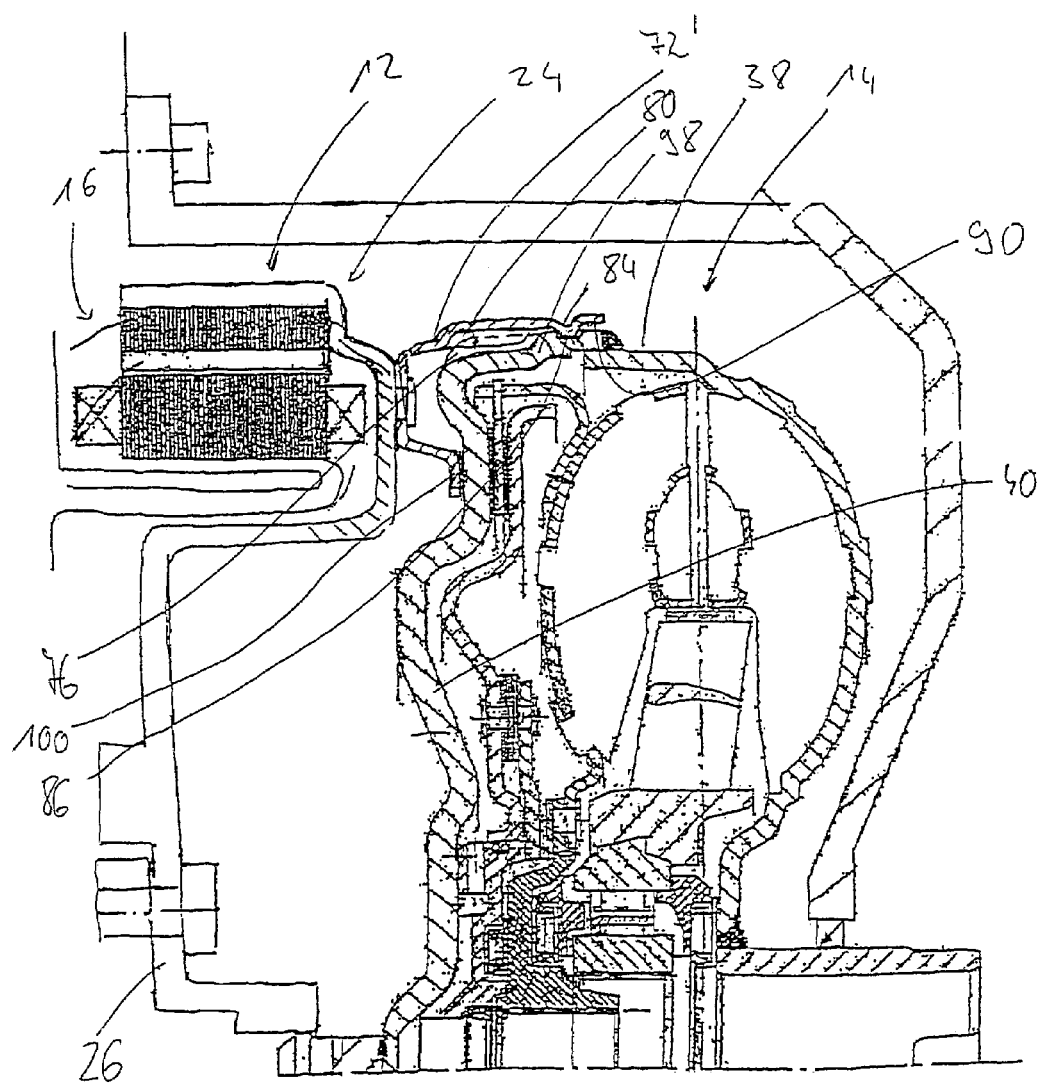
FIG. 5 is another view, corresponding to FIG. 1, of an alternative embodiment form.

In the embodiment form shown in FIG. 5, a driving element 72' is connected to the rotor carrier 26, for example, by riveting. The driving element 72' carries the toothing 80 of the rotor arrangement 24. The toothing configuration 76 of the housing arrangement 38 is now formed at the housing cover 40 of the housing arrangement 38 in a radial outer, approximately axially extending area 98 thereof. These two toothing configurations 76, 80 are also brought into a rotational driving engagement in this case by inserting one into the other axially. The catch projections 84 and the releasing portions 90 are now formed at an axial end area of that portion of the coupling element 72' having the toothing configuration 80, while the catch recesses 86, which are also formed, for example, in the manner of a bead-like groove extending in circumferential direction, are formed at the outer circumferential area of the housing cover 40 of the housing arrangement 38. Accordingly, the construction can be simplified in this case in that the coupling element 72' also forms the axial securing element at the same time. In a radial inner area, the coupling element 72' forms a friction portion 100 at which, for example, a friction lining can be provided and which contacts the outer side of the housing cover 40 when the catch projections 84 engage in the catch recesses 86 by pretensioning.

As a result of the friction action introduced by the friction portion 100, any rotational movement play which may possibly be present can only lead to a damped relative rotational movement between the rotor arrangement 24 and the housing arrangement 38 in the area of the toothing configurations 76, 80 which are in a rotational driving engagement with one another. The occurrence of impact noises and the loading of the structural component parts contacting one another which also occurs in this connection can accordingly be appreciably damped.

Figure 6:
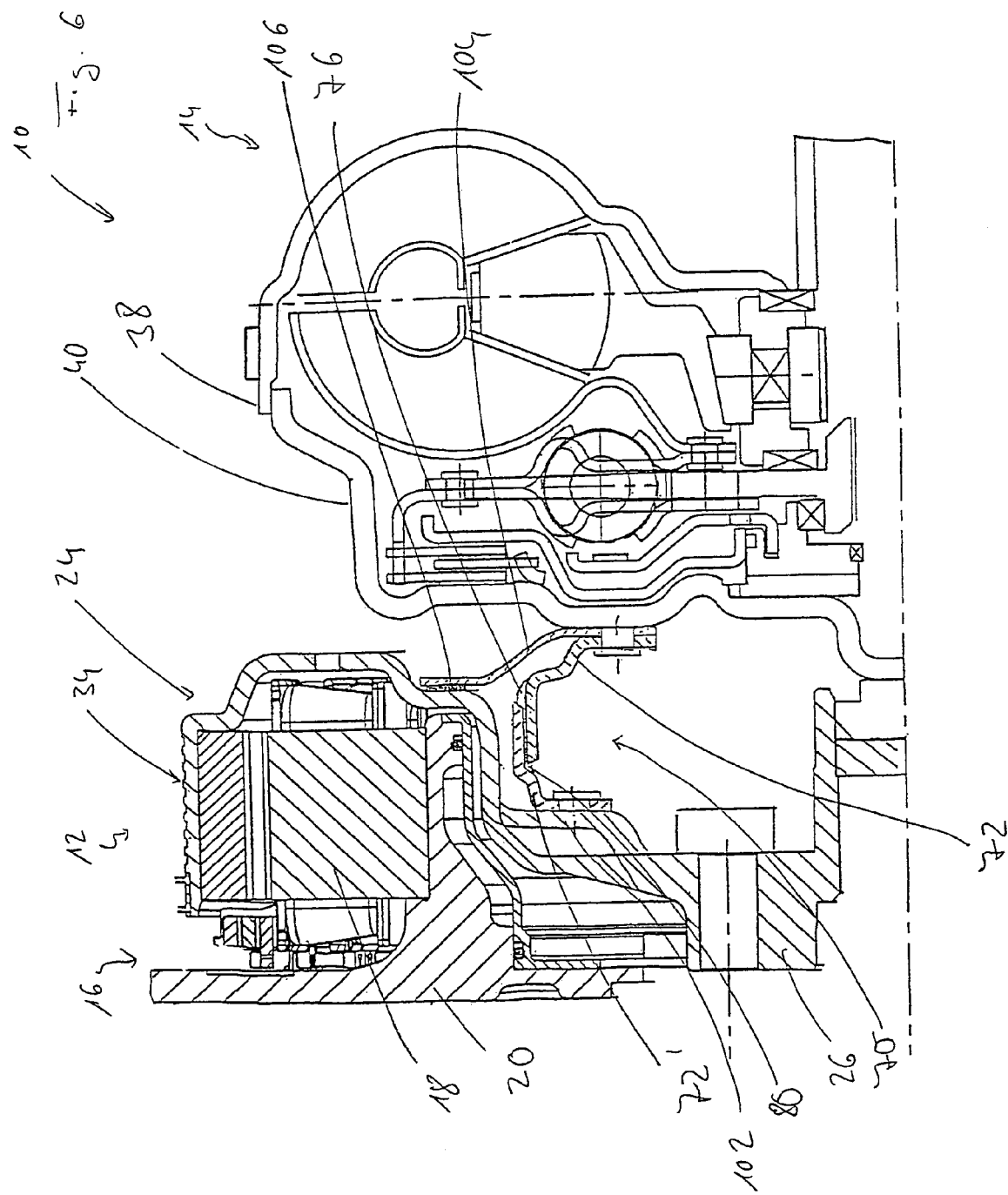
FIG. 6 is another view, corresponding to FIG. 1, of an alternative embodiment form.

The embodiment form illustrated in FIG. 6 shows the two coupling elements 72, 72', whose different embodiment forms were shown in the preceding, at the housing arrangement 38 on one side and at the rotor carrier 26 of the rotor arrangement 24 on the other side. It will be noted in this case that shaped portions 102 can be provided at the rotor carrier 26, wherein the coupling element 72' can be connected to the rotor carrier 26, e.g., by riveting, in order to increase the stability of the entire system.

The axial securing arrangement with catching action which was described above is omitted in the embodiment form shown in FIG. 6. Rather, in this case, a friction element 104 which is again ring-shaped, for example, is secured together with the coupling element 72 to the housing arrangement 38 and can carry, e.g., a friction lining 106 in its radial outer area. This friction lining 106 is in frictional contact with the rotor carrier 26 when the drive system 10 is assembled and therefore results in the damping effect, already described above, in the event of possible relative rotational movement of the housing arrangement 38 with respect to the rotor arrangement 24 due to a rotational movement play in the area of the toothing configurations 76, 80.

Figure 11:
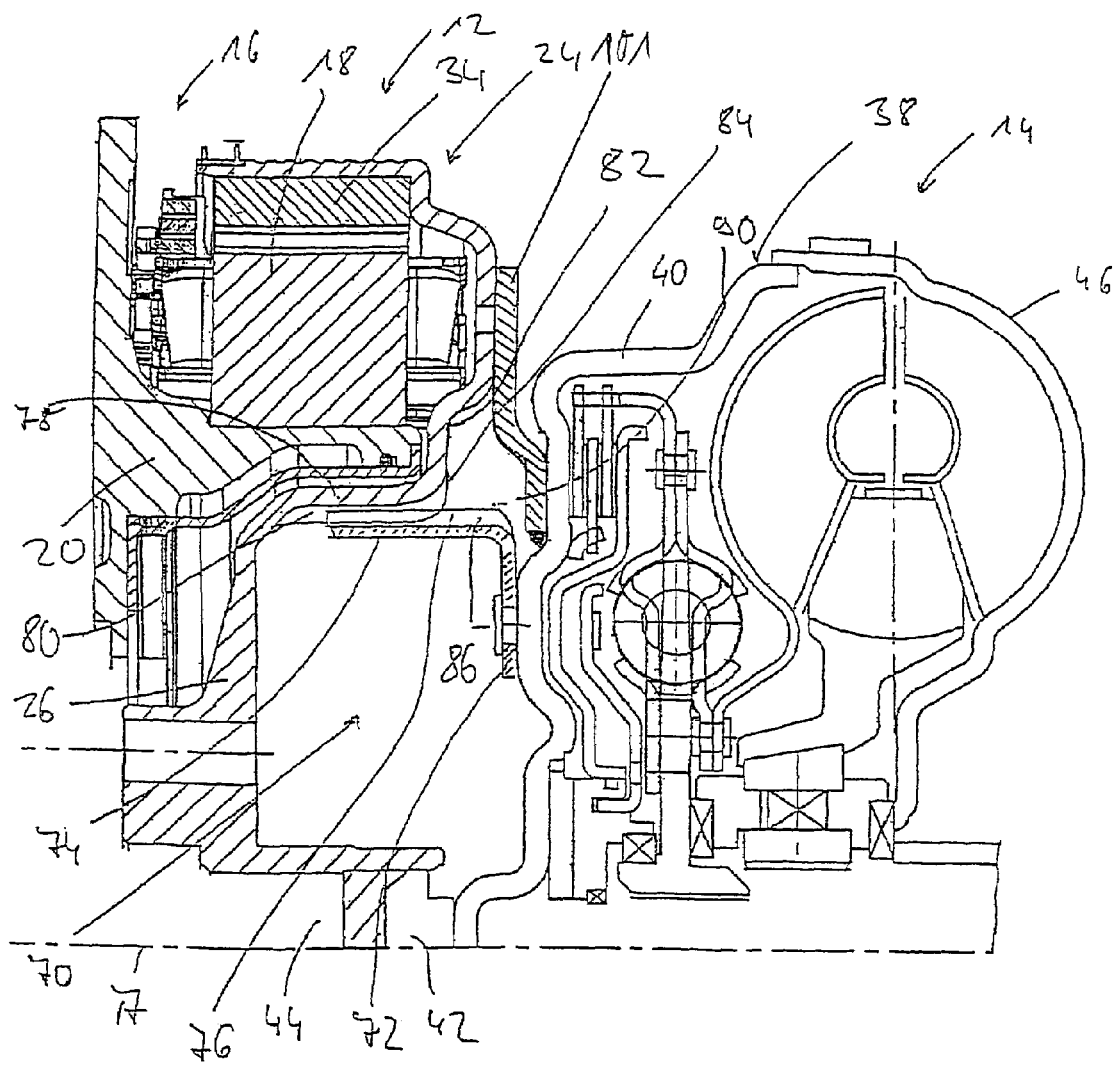
FIG. 11 is another view, corresponding to FIG. 1, of an alternative embodiment form.

FIG. 11 shows a modified embodiment form in which the housing arrangement 38 and the rotor arrangement 24 are coupled by the toothing configurations 76, 80 basically for common rotation. Further, a coupling member 101, which is ring-shaped, for example, is secured to the housing cover 40 of the housing arrangement 38 by welding or riveting or the like. This coupling member 101 contacts a corresponding surface of the rotor carrier 26 by its radial outer area. The coupling member 101 is premagnetized or is formed of magnetizable material. Because of the magnetizing of the coupling member 101 brought about in the latter case by the magnetic field of the electric machine 12 or because of the magnetization of this structural component part existing from the start, a coupling of this structural component part, induced by magnetic force interaction, to the rotor carrier 26 is achieved; that is, these two structural component parts are coupled with one another by magnetic force on the one hand and by the frictional force generated by mutual contact on the other hand, so that movement vibrations or relative movements of the rotor carrier 26 with respect to the housing arrangement 38 commensurate with the small gaps existing in the area of the toothing configurations 80, 76 can be eliminated to a great extent and rattling or excessive loading can be prevented.

Further, as a result of the magnetic force interaction mentioned above, the rotor arrangement 24 of the electric machine 12 and the hydrodynamic torque converter 14 are held together securely also in axial direction, so that a simplified assembly of this entire system can also be carried out.

It must be added with regard to the embodiment forms with friction force interaction which were described above that a friction force of this kind can also be achieved through the use of a very viscous medium; in this connection, it must be ensured that this medium should have approximately the same viscosity characteristics throughout its service life and over a large range of temperatures. For example, a displacement member which engages in a space containing the medium can provide for corresponding damping during relative movement. The space containing the viscous medium and the displacement member must be coupled with the rotor arrangement 24 and housing arrangement 38, respectively.

Figure 7:
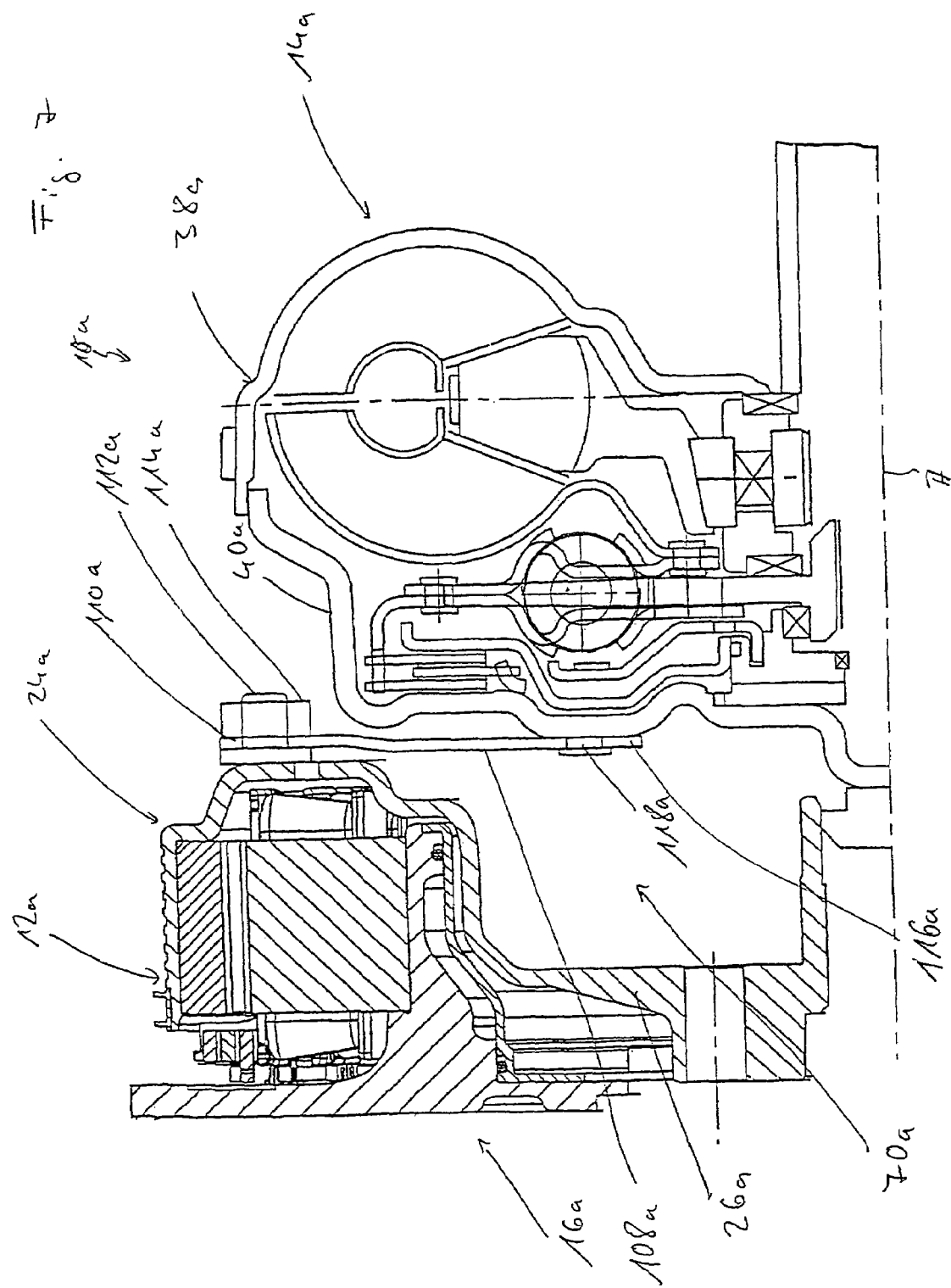
FIG. 7 is another view, corresponding to FIG. 1, of an alternative embodiment form.

FIG. 7 shows another alternative embodiment form of a drive system. Components corresponding to the components described above with respect to construction and function are designated by the same reference numbers with an added "a". It is noted that the construction steps which were described in detail in the preceding can be provided in the area of the electric machine as well as in the area of the hydrodynamic clutch device, so that a detailed description of the construction of these two system areas can be omitted with regard to this embodiment form and the further embodiment forms to be described hereinafter.

In the embodiment form shown in FIG. 7, the clutch device 70a comprises a flexible coupling element 108a which is formed, for example, from sheet metal material by stamping and is preferably ring-shaped. This coupling element 108a is secured to the rotor carrier 26a in a radial outer area 110a, for example, through the use of screw bolts 112a secured to the rotor carrier 26a and nut elements 114a screwed onto the screw bolts 112a. The coupling element 108a is secured to the housing cover 40a of the housing arrangement 38a in the radial inner area 116a by riveting. The riveting portions 118a used for this purpose can be formed, for example, by a shaping of the housing cover 40a.

The coupling element 108a can be constructed in such a way, for example, that it has a body portion which extends annularly in its radial inner area and from which various coupling arms project radially outward, these coupling arms being secured to the rotor carrier 26a. A highly stable torque transmission is achieved through the use of a plate-like, flexible coupling element 108a of this kind. Above all, a decoupling of oscillations is also introduced at the same time due to the flexibility.

Figure 8:
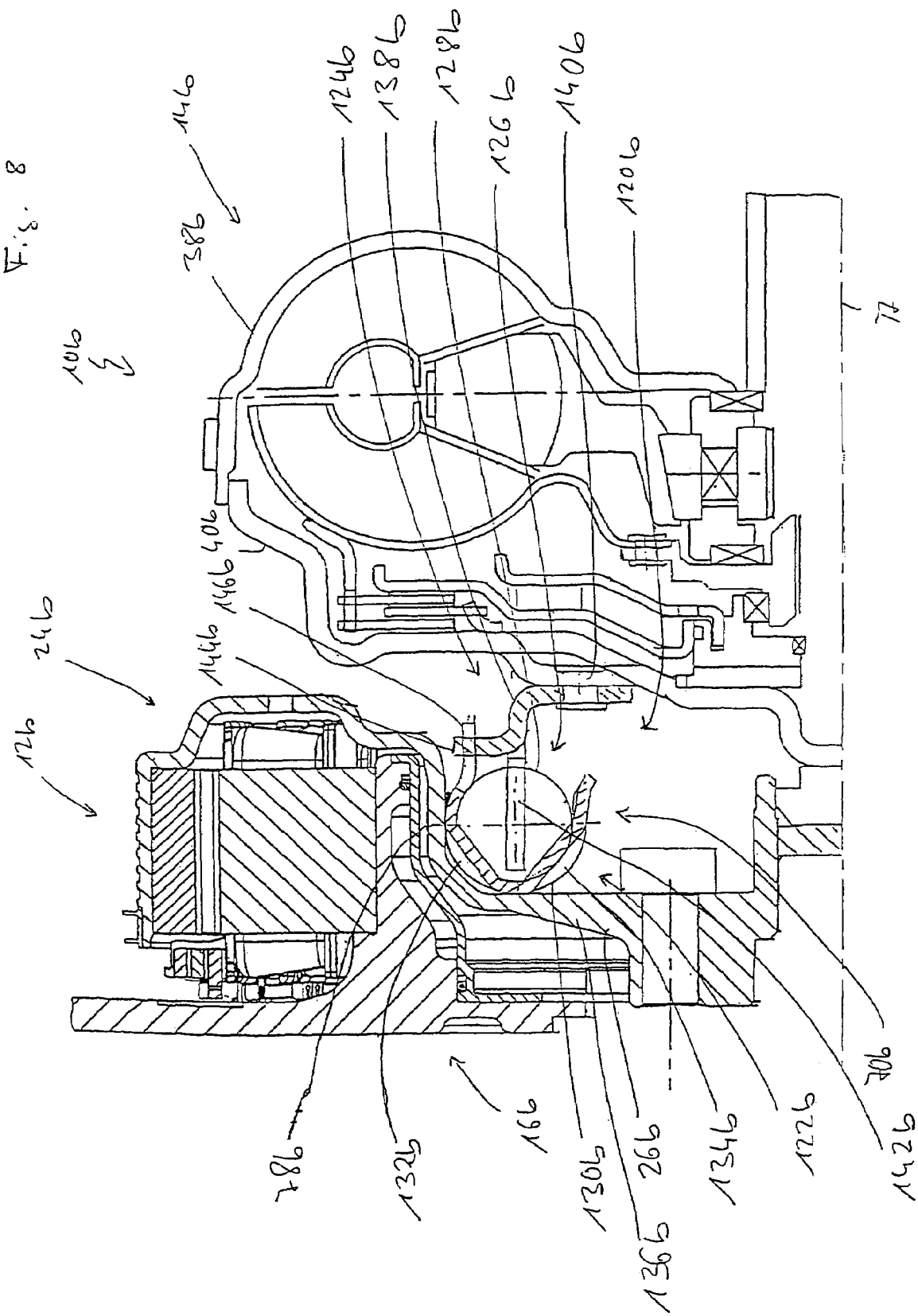
FIG. 8 is another view, corresponding to FIG. 1, of an alternative embodiment form.

FIG. 8 shows another embodiment form of the drive system. Components corresponding in construction or function to components described in the preceding are designated by the same reference numbers with an added "b". In this case, also, the internal construction of the electric machine and hydrodynamic clutch device can be carried out in the manner described above. Therefore, details of their construction may also be omitted.

In the embodiment form shown in FIG. 8, the arrangement 70b by which the housing arrangement 38b of the hydrodynamic clutch device 14b is connected to the rotor arrangement 24b of the electric machine 12b comprises a torsional vibration damper arrangement, designated generally by 120b. This torsional vibration damper arrangement 120b basically comprises a primary side 122b which is provided at the rotor carrier 24b and which is also secured thereto and a secondary side 124b which is provided at the housing arrangement 38b and is also secured thereto. The primary side 122b is coupled with the secondary side 124b by a damper element arrangement 126b for transmitting torque. In the example shown here, the damper element arrangement 126b comprises a plurality of damper elements 128*b* which are positioned successively in circumferential direction and which are constructed, for example, as helical pressure springs.

A supporting element 130*b* of the primary side 122*b* is constructed as a structural component part which runs substantially completely around the axis of rotation A and surrounds and encloses the damper elements 128*b* of the damper element arrangement 126*b* substantially on three sides, namely, on the radial outer side, on the radial inner side and axially at the side facing the rotor carrier 26*b*. Supporting projections 132*b*, 134*b* which are provided in the form of indentations of the supporting element 130*b*, which is generally formed of sheet metal material, are formed at the supporting element 130*b* for circumferential support of the damper elements 128*b*. It will be seen that in order to achieve a very compact configuration the supporting element 130*b* is positioned with the rotor carrier 26*b* in the transitional area between the substantially axially extending portion 78*b*, which was already mentioned in the preceding, and a portion 136*b* adjoining the latter on the radial inner side, and the supporting element 130*b* is secured in this area also, for example, by welding.

The supporting element 130*b* is open on the axial side facing the hydrodynamic clutch device 14*b*. A counter-supporting element 138*b* which substantially forms the secondary side of the torsional vibration damper arrangement 120*b* and which is secured, for example, by riveting, to shaped portions 140*b* formed in the area of the housing cover 40*b* for increased stability engages with counter-supporting projections 142*b* in the axial open area of the supporting element 130*b*, so that the damper elements 128*b* can also be supported at the counter-supporting projections 142*b* in circumferential direction. Therefore, by compressing the damper elements 128*b*, the housing arrangement 38*b* and the rotor arrangement 24*b* can be rotated with respect to one another in circumferential direction, so that torsional vibrations occurring in the drive system can be damped. In order to permit only a limited rotational angle and, accordingly, to protect the damper elements 128*b* from overload, stop portions 144*b*, 146*b* which can be brought into circumferential contact are provided at the supporting element 130*b* and at the counter-supporting element 138*b* and form an arrangement for limiting the rotational angle.

Figure 9:
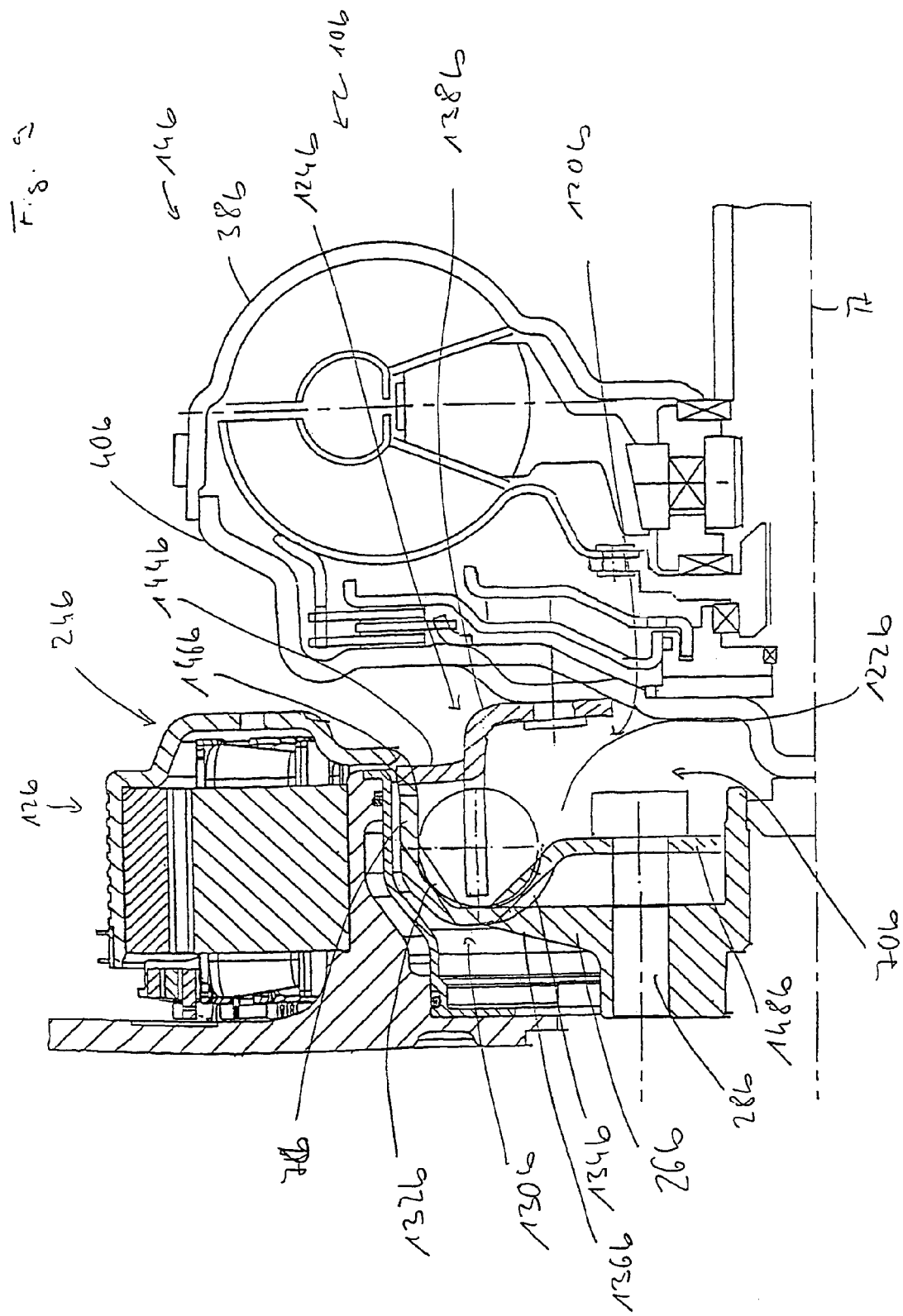
FIG. 9 is another view, corresponding to FIG. 1, of an alternative embodiment form.

In the embodiment form shown in FIG. 9, the rotor carrier 26*b* also forms at least part of the supporting element 130*b* at the same time. To this end, the supporting projections 132*b*, 134*b* can be provided in the transitional area between the substantially axially extending portion 78*b* and the approximately radially extending portion 136*b*. However, particularly the supporting projections 134*b* which are also located further inward radially can also be provided at least in part by a separate structural component part 148*b* which is fixedly connected to the rotor carrier 26*b* by the screw bolts 28*b*. Instead of a separate structural component part, corresponding shaped portions can also be provided at the rotor carrier 26*b*. In this embodiment form and, of course, also in the embodiment form described in detail with reference to FIG. 8, the stops 146*b* of the rotor arrangement 24*b* which limit the rotational angle can be provided directly by corresponding portions at the rotor carrier 26*b* with which the corresponding stop portions 144*b* of the counter-supporting element 138*b* can cooperate.

In the embodiment form shown in FIG. 9, it is, of course, also possible to form the additional structural component part 148*b*, described above, integral with the supporting element 130*b* described with reference to FIG. 8 and to insert this structural component part in corresponding cutouts of the rotor carrier 26*b*.

Figure 10:
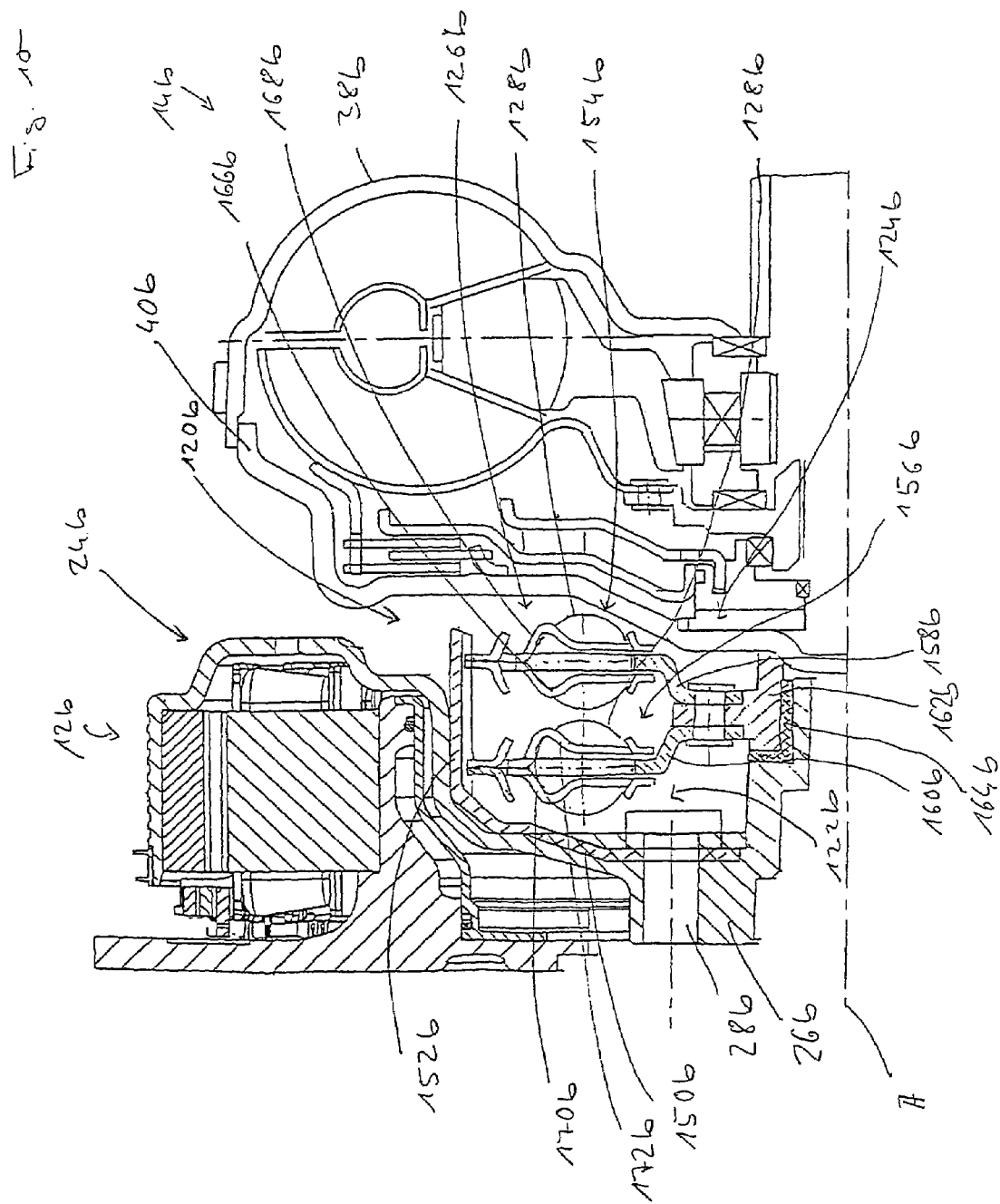
FIG. 10 is another view, corresponding to FIG. 1, of an alternative embodiment form.

In the embodiment form shown in FIG. 10, the primary side 122*b* of the torsional vibration damper arrangement 120*b* comprises a driving element 150*b* which is constructed in a cup-shaped manner and which is fixedly coupled to the rotor carrier 26*b* of the rotor arrangement 24*b* by the screw bolts 28*b*. This driving element 150*b* has a toothing configuration in its approximately axially extending, approximately cylindrical radial outer portion 152*b*. The damper element unit 126*b* comprises two sets 154*b*, 156*b* of damper elements 128*b* located adjacent to one another in direction of the axis of rotation A. A central disk element 158*b*, 160*b* of the secondary side 124*b* is associated with each of these sets 154*b*, 156*b* and is secured by riveting to a carrier 162*b* which is fixedly connected to the housing cover 40*b*, e.g., by welding. This carrier 162*b* can be supported at the radial inner area of the rotor carrier 26*b* with the intermediary of an axial/radial bearing element 164*b* in order to center the hydrodynamic clutch device 14*b* with respect to the electric machine 12*b*. In each of the sets 154*b*, 156*b*, there is a cover disk element 166*b*, 168*b* and 170*b*, 172*b*, respectively, on both sides of the central disk elements 158*b*, 160*b* which are at a distance from one another axially. These cover disk elements 166*b*, 168*b* and 170*b*, 172*b* are fixedly connected in their radial outer area, e.g., by welding, riveting or the like, and have in this location a toothing configuration which is in a rotational driving engagement with the toothing configuration, already described, at the driving element 150*b*. Like the central disk elements 158*b*, 160*b*, the cover disk elements 166*b*, 168*b* and 170*b*, 172*b* likewise form respective spring windows at which the damper elements 128*b* of the two sets 154*b*, 156*b* can be supported in circumferential direction in order to allow a relative rotational movement between the cover disk elements 166*b*, 168*b*, 170*b*, 172*b* with respect to the central disk elements 158*b*, 160*b* with the possibility of compression of the damper elements 128*b*. In the radial outer area, the central disk elements 158*b*, 160*b* can also cooperate with the cover disk elements 166*b*, 168*b*, 170*b*, 172*b* at the same time to limit the rotational angle.

In this embodiment example, the torsional vibration damper arrangement 120*b* accordingly comprises two sets 154*a*, 156*b* of damper elements 128*b* which act parallel to one another, so that this arrangement is particularly suitable for drive systems which must transmit very high torques, e.g., in commercial vehicles.

The present invention provides various steps by which a very stable and reliably operating coupling of the housing arrangement of a hydrodynamic clutch device to a rotor arrangement of an electric machine can be achieved in a simple manner. As can be seen especially in FIG. 10, the coupling with the rotor arrangement essentially means that a common rotational connection exists which, as the case may be, can also be carried out indirectly, that is, by way of mediate structural component parts such as screw bolts or the like.

The invention claimed is:

1. A drive system for connection to a drive shaft which is rotatable about an axis, the drive system comprising:
    an electric machine comprising a stator and a rotor which can be fixed to the drive shaft so that the rotor has an axis of rotation which is coaxial with the axis of the drive shaft;
    first teeth fixed to the rotor and extending parallel to the axis of rotation;

a housing of a clutch device;
second teeth fixed to the housing and engaging the first teeth so that the housing and rotor are in rotational driving engagement with one another;
a catch member fixed to one of said rotor and said housing, said catch member being formed of sheet metal and having at least one radially resilient catch projection; and
at least one catch recess fixed to the other of said rotor and said housing, said catch projection resiliently engaging in said catch recess to axially secure said housing to said rotor.

2. The drive system of claim 1 wherein the at least one catch recess is formed in the area of said first teeth.

3. The drive system of claim 1 wherein the at least one catch recess is formed in the area of said second teeth.

4. The drive system of claim 1 wherein the first teeth are provided on a structural component fixed to the rotor and the second teeth are provided on a structural component fixed to the housing, the catch member being secured to one of said structural components.

5. The drive system of claim 1 wherein the first teeth are provided on a structural component fixed to the rotor and the second teeth are provided on a structural component fixed to the housing, the catch member being formed integrally with one of said structural components.

6. The drive system of claim 1 wherein the first teeth are provided on a structural component fixed to the rotor and the second teeth are provided on a structural component fixed to the housing, the system further comprising an axial movement stop on one of said structural components.

7. The drive system of claim 1 wherein at least one of said catch members comprises a releasing portion for manually disengaging said catch member from a respective said catch recess.

8. The drive system of claim 1 further comprising a rotor carrier which carries said rotor and can be fixed to said drive shaft, said first teeth being formed in said rotor carrier.

9. The drive system of claim 8 further comprising a coupling element fixed to said housing, said second teeth being formed in said coupling element.

10. The drive system of claim 1 wherein said second teeth are formed in said housing.

11. The drive system of claim 10 further comprising a rotor carrier fixed to said rotor and a driving element fixed to said rotor carrier, said first teeth being formed in said rotor carrier.

12. The drive system of claim 1 wherein said catch member is formed with a ring and has a plurality of radially resilient catch projections arranged circumferentially, said catch recesses being arranged circumferentially for receiving respective said catch projections.

13. The drive system of claim 1 wherein the rotor lies radially outside the stator.

14. The drive system of claim 1 wherein said at least one said radially resilient catch projection can engage a respective said at least one catch recess by moving said housing toward said rotor only in a direction parallel to said axis of rotation.

* * * * *